April 6, 1926.

D. A. STRACHAN ET AL 1,579,966

CHEESE CUTTER

Filed March 20, 1925

INVENTORS
DAVID ALEXANDER STRACHAN
HAROLD ROGER SCOTT

BY  Featherstonhaugh & Co.

ATTORNEYS

Patented Apr. 6, 1926.

1,579,966

UNITED STATES PATENT OFFICE.

DAVID ALEXANDER STRACHAN AND HAROLD ROGER SCOTT, OF VANCOUVER, BRITISH COLUMBIA, CANADA.

CHEESE CUTTER.

Application filed March 20, 1925. Serial No. 17,053.

*To all whom it may concern:*

Be it known that we, DAVID ALEXANDER STRACHAN and HAROLD ROGER SCOTT, both subjects of the King of Great Britain, and both residents of the city of Vancouver, in the Province of British Columbia, Canada, have invented certain new and useful Improvements in Cheese Cutters, of which the following is a specification.

Our invention relates to improvements in cheese cutters the objects of which are to provide means whereby portions of cheese of rectangular form may be accurately gauged as to weight or price and cut from the whole. A further object is to provide means whereby the slide upon which the cheese is set may be conveniently drawn in a rearward direction if required.

The invention consists essentially of a base upon which a cheese bearing slide is adjustably movable in one direction by a lever and a pivotally hung knife which is adapted to cut through the cheese and to cover the cut surface thereof to prevent its exposure pending subsequent cutting, as will be more fully described in the following specification in which:—

In the drawings like characters of reference indicate corresponding parts in each figure.

Figure 1:
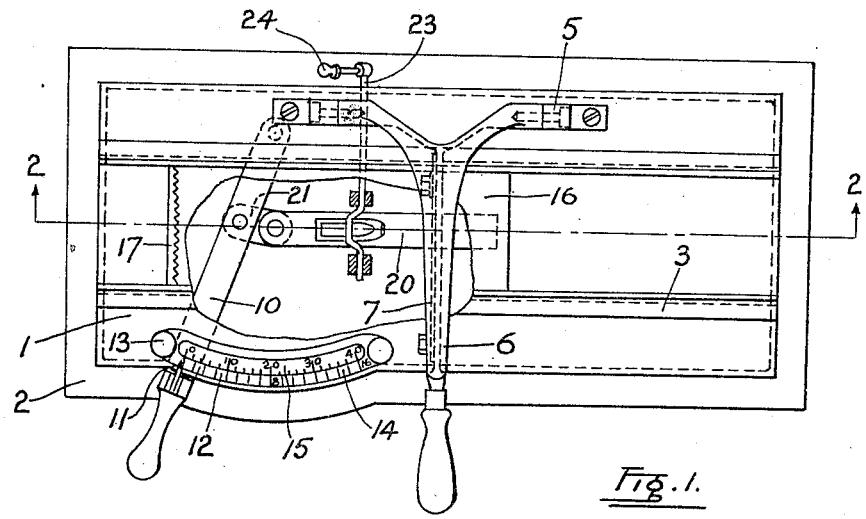
Fig. 1 is a plan partly in section, of the invention.
Figure 2:
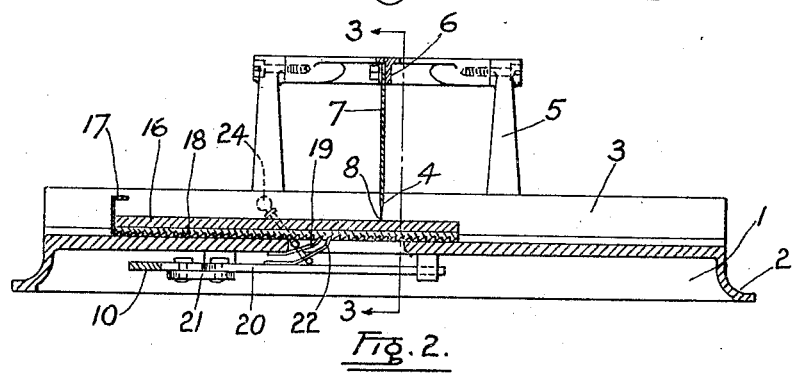
Fig. 2 is a longitudinal section on the line 2—2 of Fig. 1.
Figures 3, 4:
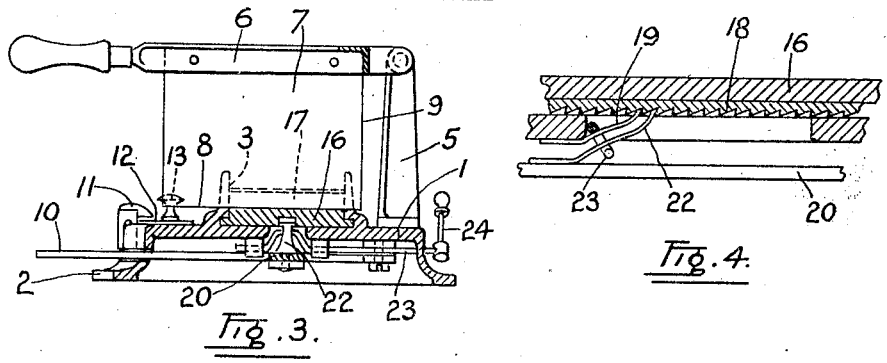
Fig. 3 is a transverse section on the line 3—3 of Fig. 2.
Fig. 4 is an enlarged fractional sectional view showing the slide moving spring pawl.

The numeral 1 indicates generally the base surrounded by a supporting rim 2 and having a pair of parallel guides 3 which are transversely slotted as at 4, see Figure 2, to permit the knife to come into close contact with the slide and to completely sever the block of cheese.

The numeral 5 indicates a pair of standards between which a handled lever 6 is fulcrumed. The lever is provided with a rectangular knife 7 having a lower cutting edge 8 and a rear cutting edge 9. Pivotally mounted on the underside of the base 1 is a handled lever 10 having adjacent its outer end a pointer 11 which is adapted to indicate the weight or price, or both, of the cheese cut upon a scale 12. The scale 12 comprises a strip of material detachably secured to the base by a pair of thumb nuts 13 and is graduated to two readings 14 and 15, the reading 14 indicating pounds and fractions thereof, and the reading 15 indicating the price of such poundage at a given cost. So that if the cheese is to be sold at 40 cents per pound, a scale having a price base of 40 cents would be used, but if a higher priced cheese is to be sold a scale having a correspondingly increased price base would be substituted.

The numeral 16 indicates a slide operating in suitable grooves formed at the bases of the guides 3 having a follower strip 17 at its rear edge which is adapted to engage the rear end of the block of cheese placed upon the slide, to hold it in position thereon. A rack 18 is secured to the underside of the slide which is normally engaged by a spring pawl 19 secured to the base for the purpose of preventing the rearward movement of the slide 16.

The numeral 20 indicates a slidably mounted bar supported from the underside of the base 1 which is operatively connected to the lever 10 by a link 21 and is provided with a spring pawl 22 which is adapted to engage the rack 18 to move it in a forward direction when a similar movement is imparted to the lever 10 and to slip along the rack as the lever is returned. It will be noted that when the lever 10 is in its most rearward or zero position, as shown, that the pawl 19 is overlying the pawl 22 so that by turning the cranked rod 23 by means of the trip lever 24 both pawls are depressed and disengaged from the rack 18 to permit the slide 16 to be returned to starting position.

Having thus described the several parts of our invention we will now briefly explain its operation.

The slide being withdrawn to starting position, or to the left of the base 1, a cheese is placed thereon and pressed firmly against the follower strip 17, the slide is then pushed forward until the cheese is in direct contact with the knife 7 and the lever 10 swung to the left or zero position. When a desired amount of cheese is to be cut, the levered handle 6 is raised until the knife 7 is clear of the cheese and the lever 10 is moved to the right, bringing the pointer 11 to the desired poundage indicated on the scale 12, this movement of the lever 10 moves the slide until that poundage of cheese projects to the right beyond the knife, when the levered handle 6 is pulled down to sever it from the cheese, the lever 10 is then withdrawn to the zero position ready for subsequent operation, the slide being held against return by the engagement of its rack 18 by the spring pawl 19.

What we claim as our invention is:

1. In a device of the character described comprising a support, a slide movable thereon, means for moving the slide in one direction and a rack carried by the slide, the combination of a pawl resiliently engaging said rack to prevent reverse movement of the slide, and a rotatably mounted pawl releasing shaft including a crank portion positioned to overlie the pawl and serving to move the pawl out of engagement with the rack on rotation of the shaft to a predetermined position.

2. A device as recited in claim 1 in which the aforesaid means for moving the slide in one direction includes a drive pawl engaging the rack and so positioned as to be moved out of engagement with said rack by the operation of the pawl releasing shaft to the aforesaid predetermined position.

3. In a device of the character described comprising a slide and a support therefor, the combination of a bar extending longitudinally of the slide and slidably supported therebeneath, a lever extending transversely beneath the slide and pivoted at one end to said support, a connection between the lever and said bar and means carried by the bar end engaging the slide to move the latter upon actuation of the lever in one direction and means for holding the slide stationary during reverse movement of the lever.

4. In a device of the character described comprising a slide, a support therefor and a rack secured to the bottom of the slide and extending longitudinally thereof, the combination of a bar slidably supported beneath the slide and movable longitudinally thereof, an inherently resilient spring strip carried by the bar and constituting a pawl resiliently engaging said rack, means for reciprocating said bar and means operable to disengage the pawl from the rack.

5. A device according to claim 4 including a stationary pawl carried by the supporting structure to prevent movement of the slide during movement of the first mentioned pawl in one direction, said second mentioned pawl being positioned to be released prior to the releasement of the first mentioned pawl and through the agency of the same releasing means.

Dated at Vancouver, B. C., March, 1925.

DAVID ALEXANDER STRACHAN.
HAROLD ROGER SCOTT.